United States Patent [19]

Surana et al.

[11] Patent Number: 4,519,039
[45] Date of Patent: May 21, 1985

[54] DIGITAL COIL DIAMETER FUNCTION GENERATOR AND REEL MOTOR DRIVE SYSTEM EMBODYING THE SAME

[75] Inventors: Bhupendra S. Surana, East Amherst; William H. Snedden, Newstead, both of N.Y.

[73] Assignee: Westinghouse Electric Corp., Pittsburgh, Pa.

[21] Appl. No.: 401,425

[22] Filed: Jul. 23, 1982

[51] Int. Cl.³ .............................................. G06G 7/26
[52] U.S. Cl. ...................................... 364/469; 318/7; 242/75.51; 364/471
[58] Field of Search ............... 364/469, 470, 471, 607, 364/718, 719, 722, 851, 857, 858; 307/263, 228, 490; 328/181, 185; 318/6, 7; 242/45, 75.45, 75.5, 75.51, 75.52, 75.53, 191

[56] References Cited

U.S. PATENT DOCUMENTS

| | | | |
|---|---|---|---|
| 3,686,639 | 8/1972 | Fletcher et al. | 340/172.5 |
| 3,814,310 | 12/1975 | Saffudin | 340/172.5 |
| 3,944,989 | 3/1976 | Yamada | 340/172.5 |
| 3,976,981 | 8/1976 | Bowden | 340/172.5 |
| 4,000,804 | 1/1977 | Zaltieri | 318/7 |
| 4,023,902 | 5/1977 | Ungerman | 355/52 |
| 4,448,366 | 5/1984 | Fludzinski | 318/7 |

OTHER PUBLICATIONS

"Programmable Logic Controllers—Painless Programming to Replace the Relay Bank", by G. Lapidus in Control Engineering, Apr. 1971, pp. 49-60.

Primary Examiner—Joseph Ruggiero
Assistant Examiner—Allen MacDonald
Attorney, Agent, or Firm—C. M. Lorin

[57] ABSTRACT

A programmable controller including coil diameter calculator and strip speed derivation and inertia compensation is associated with a reel system for the generation in normalized digital form of the coil diameter of the reel instantaneously to allow initial calibration between successive coil winding and unwinding operations and automatic generation of a current reference for reel motor drive control.

2 Claims, 21 Drawing Figures

DIGITAL COIL DIAMETER FUNCTION GENERATOR AND REEL MOTOR DRIVE SYSTEM EMBODYING THE SAME

CROSS-REFERENCE TO RELATED APPLICATIONS

Copending patent application Ser. No. 06/401,287 filed 07/24/82 entitled "Digital Ramp Function Generator And Motor Drive System Including The Same" by W. N. Snedden and M. Safiuddin.

Copending patent application Ser. No. 401,426 filed 07/23/82 entitled "Digital Inertia Compensation Generator And Reel Motor Drive System Embodying The Same" by M. Safiuddin and B. S. Surana.

BACKGROUND OF THE INVENTION

The invention relates to function generators, in general, and more specifically to the determination of the coil diameter and speed reference signals in a reel motor drive system.

It is important for the operator to be able to controllably accelerate, or decelerate, a reel motor drive system from some initial speed to a selected terminal speed. This is particularly useful in a rolling mill, in a paper mill winder, where a strip of material is being unwound from a pay-off reel and rewound on a delivery reel. The tension of the strip is to be maintained constant as a function of varying diameters on the reel, and the motor drives are automatically controlled in speed for that purpose. Accordingly, the rate of change of the speed, depending upon the size of the reels and the nature of the strip, has to be defined and set under varying circumstances by the operator. Moreover, in a rolling mill, where the strip is passed through processing roll stands, the stands are controlled in speed under a master reference with individual stand speed regulators maintaining constant mass flow between the pay-off reel and the delivery reel. In such a case, it is necessary to be able to adjust immediately the speed rate collectively and individually at each stand as the overall process requires. In particular, when changing reels between pay-off and delivery ends it is required to stop winding at the operator's command and to rewind, or unwind. All these operations require the knowledge of the coil diameter since it initially determines the calibration conditions, and when running it conditions tension adjustments and inertia compensation for acceleration and/or deceleration.

It is common at the present time to instantaneously calculate the coil diameter and calibrate initial and final coil diameter values with operational amplifier circuitry. However, operational amplifiers are subject to drift.

It is now proposed, for coil diameter calculation and calibration, to take advantage of digital treatment and microprocessor technology in order to improve both cost and sophistication and at the same time provide an equipment which can be handled by an operator devoid of the expertise normally required in programming and customizing the equipment in the field.

SUMMARY OF THE INVENTION

The invention resides in providing a ladder-diagram programmable controller for instantaneously generating a signal representing the calculated coil diameter and for providing initial and final coil diameter values in a reel system motor drive. The ladder diagram according to the present invention can be adjusted in the field by the plant operator taking into account instantaneous operative conditions when exchanging and selecting pay-off and delivery coils of strip material at both ends of a reel system.

DESCRIPTION OF THE PREFERRED EMBODIMENT

Figure 1:
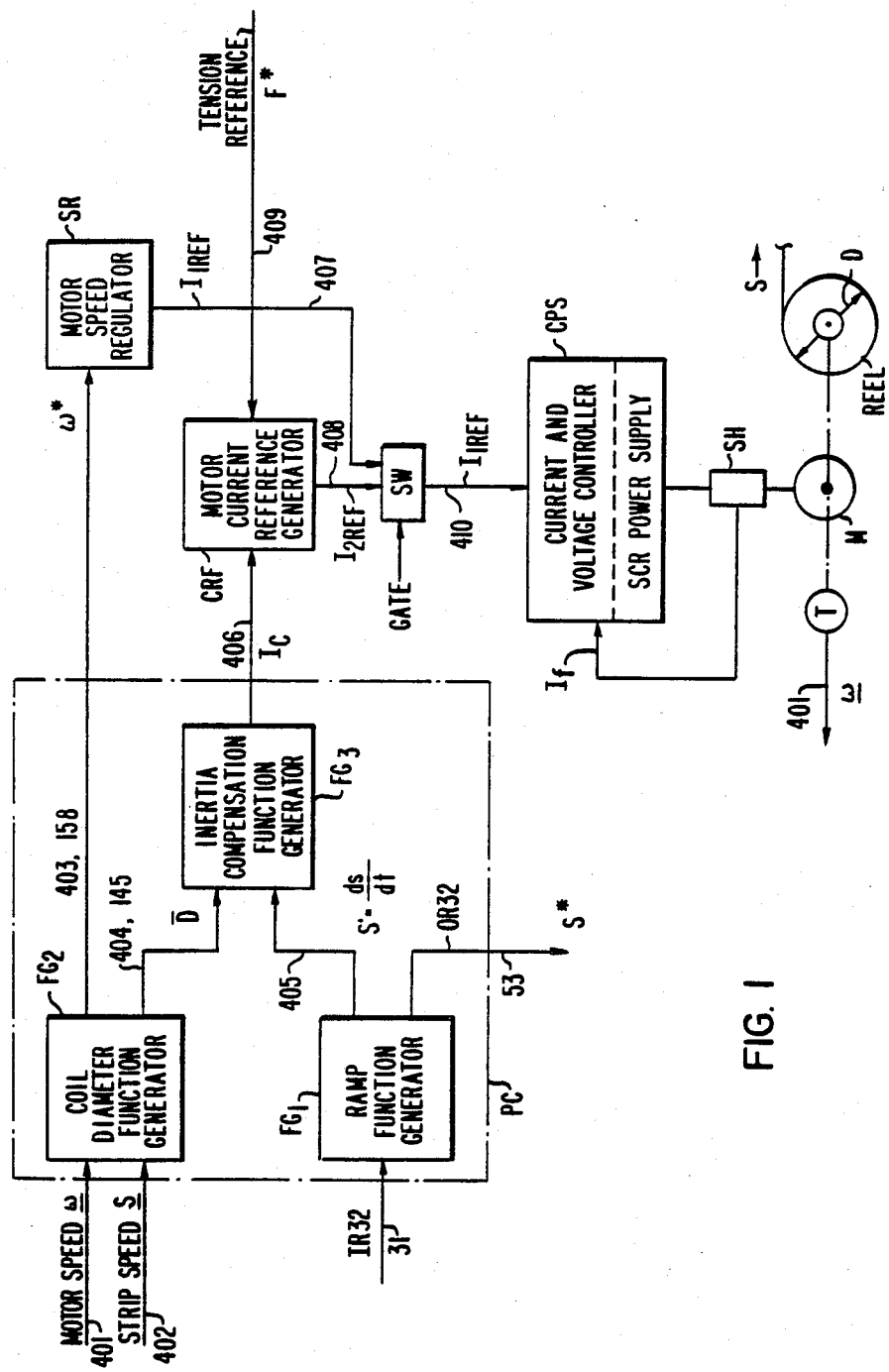
FIG. 1 shows the programmable controller according to the invention in circuit with the regulator of a reel system.

Referring to FIG. 1, a reel drive control system is illustrated embodying a programmable controller including three function generators, $FG_1$, $FG_2$ and $FG_3$.

Function generator $FG_1$ is a ramp function generator used for the generation of a reference strip velocity signal $S^*$ and a signal $S = ds/dt$ representative of the derivative thereof. Function generator $FG_1$ is fully described in copending patent application Ser. No. 06/401,287, filed July 23, 1982 concurrently with the present application by M. Safiuddin and W. H. Snedden.

Function generator $FG_2$ is a coil diameter calculation function generator according to the present invention. It is used for the generation of a signal representing the instantaneous normalized diameter of the coil on the reel D, and a motor speed reference signal $\omega^*$ to be applied to the motor speed regulator SR of the reel drive system.

Function generator $FG_3$ is an inertia compensation function generator used to generate during acceleration and/or deceleration a compensating current $I_C$ for the motor current reference generator CFR of the reel system. Function generator FG3 is fully described in copending patent appliation Ser. No. 401,426 filed July 23, 1982 concurrently with the application by M. Safi-uddin and B. S. Surana.

Figure 2:
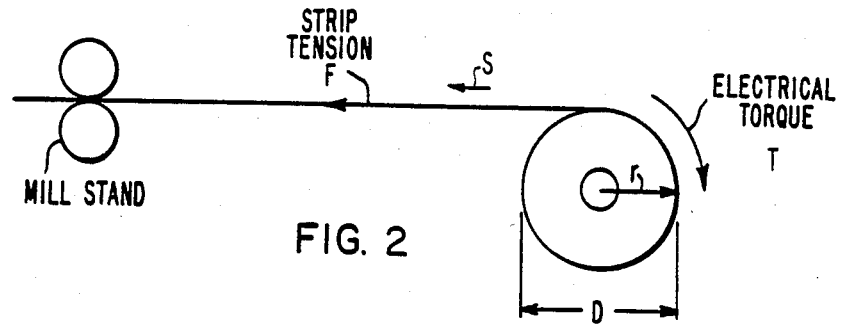
FIG. 2 is illustrative of the parameters of a reel in rotation with a strip of material pulled through a mill stand.

Referring to FIG. 2, a general reel-tension simplified system is shown to illustrate that the mechanical torque exerted by the reel R is made up of two components: the torque due to strip tension=F and the torque required to overcome inertia during acceleration=$J\, d\omega/dt$. The electrical torque due to the motor is $b\phi i$. For energy balance, mechanical torque is equal to electrical torque, i.e., $b\phi i = F + dw/dt$. This leads to the expression for strip tension:

$$F = b \cdot \frac{\phi}{r} \cdot i - \frac{1}{r} J \frac{dw}{dt}$$

which for steady state conditions reduces to:

$$F = b \cdot \phi/r \cdot i$$

and is expressed in terms of the coil diameter D as follows:

$$F = k_1 \cdot \phi/D \cdot i \qquad (1)$$

It can be seen from equation (1) that to maintain constant strip tension F, two approaches are possible.

A conventional reel drive to regulate for constant armature current (i) requires that the ratio $\phi/D$ be maintained constant. In order to maintain the ratio $\phi/D$ constant, the reel motor field flux $\phi$ is varied in proportion to the coil diameter throughout the coil build-up range, regardless of mill speed. For this reason, a reel drive motor is usually selected with a field range equal to the range of coil build-up.

The coil diameter leads to the following considerations.

Since the motor field flux is made proportional to the coil diameter, the motor is always operated at less than its full torque capability, except for the short time during which the coil diameter is maximum. This means that the acceleration and deceleration of such drives, and hence of the whole mill, are usually limited by the commutating ability of the reel motors at weak field condition, as at minimum coil diameter.

It may not always be economical, or practical, to select a reel motor that has a field range equal to the coil diameter range. At times, it may be desirable to select a motor field range greater than the amount of coil build-up, and, at other times, the field range provided should be less than the coil build-up range. The best choice will depend not only upon the design limits and cost of the drive motors, but also upon the range of coil build-up.

In addition to requiring the calculation of the diameter D in order to maintain the ratio $\phi/D$ constant, the conventional reel drive also requires the calculation of D for inertia compensation. In this regard, the inertia compensation current is given by: $I_a = S\,(A/D^2 + BD^2)$. As will be seen, the second approach to maintaining constant strip tension F also requires the calculation of D, both for strip tension control and for inertia compensation. This second approach which will be used, hereinafter, as an illustration for the calculation of the diameter in accordance with the present invention. This illustration is the one used in the maximum torque type of reel drives. Here, the regulator system for the reel drive, like in a stand regulator, allows the operation of the reel motors at maximum possible flux compatible with a certain speed. In other words, the motor is maintained at full field until base speed and, from then, on the field is weakened only by the amount necessary to obtain increased motor speed. This allows for a much greater freedom in the choice of the reel drive motor. In addition, operation with maximum flux amounts to operation with the maximum available motor torque at all times, and hence a more efficient utilization of the reel motor.

A continuously variable acceleration (and deceleration) ramp is chosen for the mill that is made a function of the load in any of the main drive machines (stand or reel drives). When such ramp and the maximum torque reel system are incorporated into the mill, the result is an integrated control system that makes it possible to utilize the full capacity of all main drive machines at both steady state and transient (acceleration-deceleration periods) rolling conditions.

Thus, it is clear that, like the conventional reel drive, maximum torque reel regulation also involves knowing the coil diameter. The armature current (i) is made proportional to the coil diameter D and inversely proportional to motor field flux $\phi$.

$$i = k_2 \frac{D}{\phi} \qquad (2)$$

the tension, F, in equation (1) can then be written:

$$F = k_1 \cdot \frac{\phi}{D} \cdot k_2 \frac{D}{\phi} = k_1 k_2 = \text{constant}$$

Thus the tension will again be constant and can be set to any desired value by adjusting the proportionality constant, $k_2$. The important point is that the field flux can have any value (limited only by the machine characteristics) and the tension will remain constant as long as the armature current tracks the value of $D/\phi$. The fact that $\phi$ can receive any value is used to advantage by making the flux the maximum possible for all conditions. This means that the motor is maintained at full field for all conditions of operation that do not require the reel motor to rotate with a speed greater than base speed. It is even possible that the motor be kept at full field throughout the entire coil build-up, provided only that the mill rolling speed is of a low enough value to allow the reel motor to follow the mill without having to rotate faster than its base speed. This condition will occur for all mill rolling speeds smaller than the product of the reel motor base speed by the minimum coil diameter (mandrel diameter). For mill speeds higher than the above value, the reel motor field will be weakened by the amount necessary to allow for a corresponding higher speed.

In order to obtain the operation of the reel system at maximum flux and with armature current proportional to $D/\phi$, two regulating systems are used: a cemf regulator operating on the motor field and a current regulator operating on the motor armature.

The motor field flux is maintained at its maximum value, $\phi_m$, until the cemf reaches base speed value. Above motor base speed, the cemf regulator regulates for a constant cemf and the field current (hence field flux) is reduced, as necessary, to maintain the cemf constant as the reel motor speed is being increased above base speed.

Thus, we have two zones of operation:
Zone 1, where:

$$n < n_b, \ e < e_m, \ \phi = \phi_m = \text{constant}$$

from equation (2)

$$i = k_2 \frac{D}{\phi} = k_3 D$$

i.e., armature current is regulated proportional to coil diameter, D.

Zone 2, where:

$$n > n_b, \ e > e_m = \text{constant} \ \phi < \phi_m$$

from equation (2)

$$i = k_2 \frac{D}{\phi}$$

$$i = k_2 \frac{Dw}{\phi w} = k_3 S$$

i.e., armature current is regulated proportional to strip speed, S.

Figure 3:
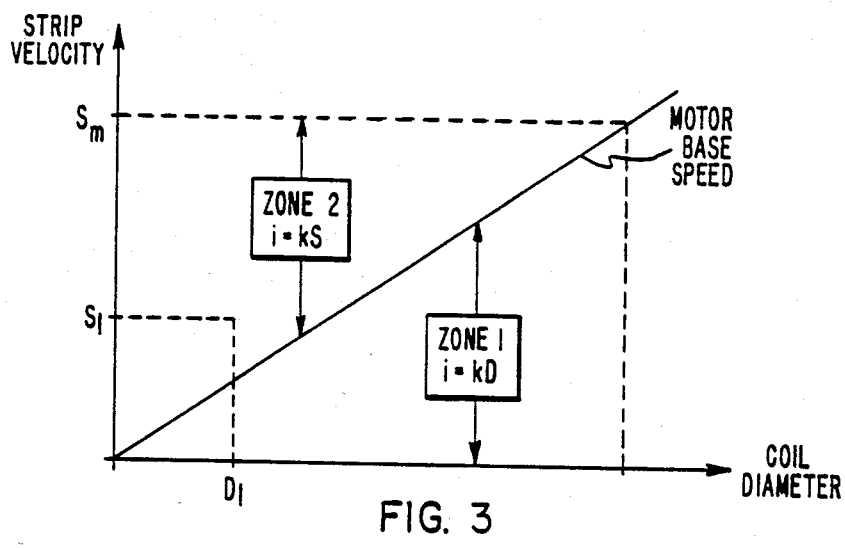
FIG. 3 is a curve characterizing the base speed line of a motor driving a reel separating a zone of regulation as a function of strip velocity and a zone of regulation as a function of coil diameter build-up.

The two zones of operation are demonstrated graphically in FIG. 3.

It can be seen from FIG. 3 that as long as strip velocity for a given coil diameter is such that the reel motor does not exceed its base speed, the reel current will be regulated in proportion to coil diameter build-up. The field flux is maintained constant at rated value and maximum motor torque is available for tension control.

For cases where strip velocity demands motor speed above its base speed, for instance at strip speed $S_1$ with diameter $D_1$, the motor field flux will be weakened only by the amount necessary to achieve that speed. The reel motor current will now be regulated in proportion to strip velocity.

The above can be expressed in simple mathematical form by transposing equation (1) into an expression for current and adding accelerating current, $I_a$; total current, $$i = \frac{1}{k_1 \phi} F \times D + I_a \tag{3}$$

substituting for $I_a$ $$i = \frac{1}{k_1 \phi} \cdot F \times D + \frac{D}{\phi} \left( \frac{A}{D^2} + B D^2 \right) \dot{S}$$

multiplying and dividing the first term of the above equation by "aw" and simplifying, we obtain:

$$i = \frac{a}{b} F \left( \frac{S}{e} \right) + \left( \frac{D}{\phi} \right) \left( \frac{k_1}{D^2} + k_2 D^2 \right) \dot{S} \tag{4}$$

where a is the motor cemf constant, b the motor torque constant, ω the angular velocity, and e the cmf of the motor. Ignoring for the moment accelerating current requirements, it appears that for a constant tension F in steady state conditions, the current reference signal to be generated varies according to one of the following expressions:

(a)

$$i = \frac{a}{b} F \left( \frac{S}{e} \right) \tag{5}$$

$$i = \frac{a}{b} F \frac{\omega r}{\omega \phi} = k D$$

for constant flux ($\phi_m$) below base speed (b)

$$i = \frac{a}{b} F \left( \frac{S}{e} \right) = k S \tag{6}$$

for constant cemf ($e_m$) above base speed.

The above functions can be generated either by means of a servo system or statically.

Figure 4:
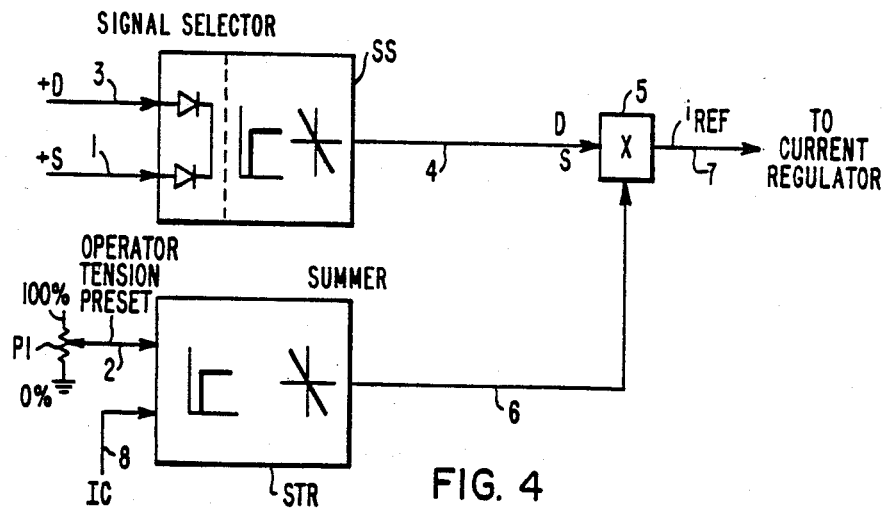
FIG. 4 shows prior art circuitry for signal selection in accordance with the two zones of FIG. 2 and the associated tension reference setting for current regulation of the motor drive.

Referring to FIG. 4, a static circuit for implementing equations (5) and (6) includes a signal selector SS responsive on line 1 to the strip velocity signal +S, and to the reel diameter signal +D on line 3. Signal selector SS is symbolized by two diodes $D_1$ on line 1, $D_3$ on line 3, allowing the larger of the two signals to be passed onto the output line 4. The signal of line 1 corresponds to equation (6) when it exceeds the signal of line 3, controlling the motor for constant cemf ($e_m$) below the base speed, e.g., when the reel is of small diameter and turning above base speed. Conversely, the motor drive is controlled for constant flux ($\phi_m$) when the reel is receiving the strip on a large diameter, rotating below base speed, in accordance with equation (5). In such case it is the signal of line 3 which is passed on line 4.

FIG. 4 also shows on line 2 a tension reference preset by the operator with a rheostat $P_1$ and an inertia compensation signal IC applied on line 8. The signals of lines 2 and 8 are summed by a tension reference summer STR which outputs on line 6 a signal multiplied with the signal from line 4 by a multiplier 5. The output of the multiplier is on line 7. It is the current reference going to the current regulator.

For the strip tension to remain constant during changes in the mill speed, this extra torque must be anticipated and forced upon the reel motor by feeding an extra signal to the current regulator. This signal will sum up with the reference signal, causing the armature current to increase during acceleration of a rewind reel and to decrease during deceleration (for a pay-off reel, the current will decrease during acceleration and will increase during deceleration). It can be shown that the appropriate current signal necessary for acceleration, or deceleration, is given by the following expression:

$$I_a = \dot{S} \left( \frac{D}{\phi} \right) \left( \frac{A}{D^2} + B D^2 \right) \tag{7}$$

where:
$I_a$ = armature current necessary for inertia compensation
$\dot{S} = ds/dt$ = rate of change of strip speed
D = coil diameter
A, B = constants It is recalled that, for conventional reel systems, the inertia compensation current is given by:

$$I_a = \dot{S}\left(\frac{A}{D^2} + BD^2\right) \quad (8)$$

The only difference between equations (7) and (8) lies in the extra term $D/\phi$ appearing in the expression which is automatically taken care of by equations (5) or (6) as implemented in FIG. 4. The latter applies to a maximum torque reel system. Equation (8) is implemented by the circuitry of FIG. 5.

Figure 5:
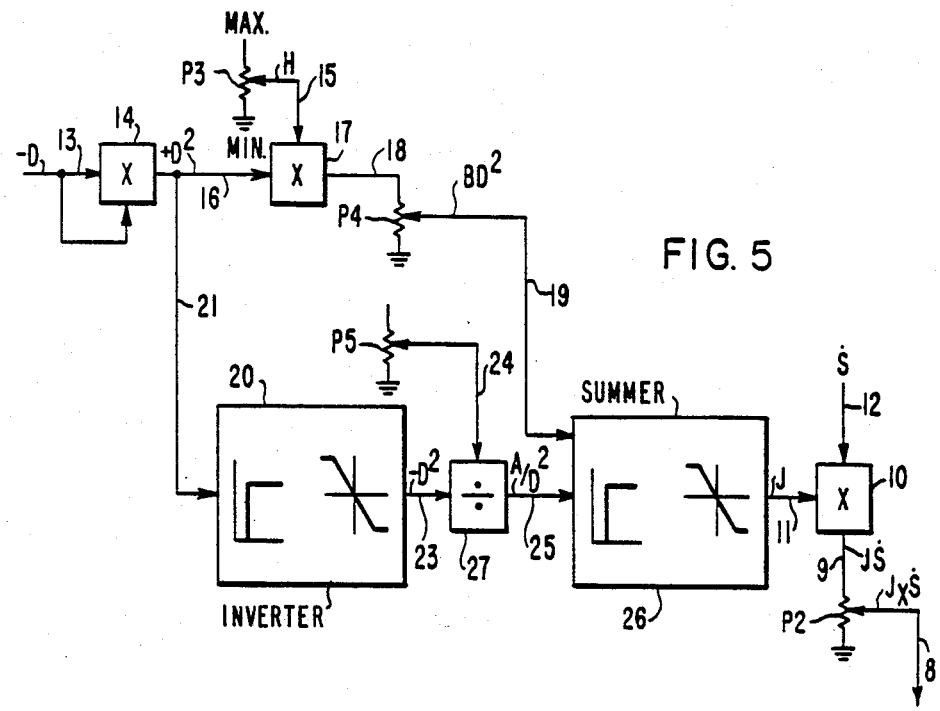
FIG. 5 shows prior art circuitry for the determination, with a derived coil diameter signal, of inertia compensation to modify the tension reference setting of FIG. 4.

Referring to FIG. 5 the inertia compensation function of equation (6) requires diameter D which is used to generate on line 8 of FIG. 4 a signal $I_C$ proportional to the current required for inertia compensation. The signal of line 8 (FIG. 4) is derived from a potentiometer $P_2$ supplied on line 9 with the output $(J \times S)$ from multiplier 10 which receives on one side the inertia J (on line 11) and, on the other side the rate of speed S (on line 12) of the strip. In accordance with equation (6), the diameter signal $(-D)$ is applied on line 13 to a multiplier outputting a signal $(+D^2)$. The strip width H is derived on line 15 from the setpoint of a potentiometer $P_3$. Signal $(+D^2)$ from multiplier 14 is applied with the signal of line 15 to a multiplier 17 to derive the value $BD^2$ on line 19 after potentiometer $P_4$ from line 18 and potentiometer 17. The signal $(+D^2)$ is inverted to $(-D^2)$ by inverter 20, via line 21. The output $(-D^2)$ on line 23 from inverter 20 is applied to a divider 27, and the constant A of equation (6) is obtained from a potentiometer $P_5$ on line 24. The outputted term $A/D^2$ is added to the term $BD^2$ from line 19 by a summer 26, to generate the J signal of line 11. The coil diameter D signal and the strip width H signal are set, typically with a maximum value of 10 volts. Potentiometers $P_4$ and $P_5$ are set so that $J = 10$ volts at the maximum inertia compensation required in the reel system. Potentiometer $P_5$ should be set first at minimum coil diameter for a fixed inertia compensation when $P_4$ is at a zero setting. Potentiometer $P_2$ is then used to properly scale the reference signal IC to the tension reference summer (STR on FIG. 4). For example, if the tension reference summer STR is set at 10 volts for 175% tension, when the inertia compensation signal of line 8 is at 50%, the potentiometer $P_2$ will be set to provide $$J \times \dot{S} = 50/175 \times 10v = 2.86v$$

The tension reference is a signal, the magnitude of which depends upon the tension reference input and the motor field flux. When the motor is above base speed, the motor field is weakened and the current must be raised in order to maintain constant tension.

The preceding considerations have been with respect to a reel motor drive operating to wind or to unwind a reel such as shown in FIG. 2. A tension reel system in fact uses a pay-off reel PR at the entry and a rewind reel RW at the delivery end of the system. The system may be a rolling mill of the tandem, or reversing type. It may also be a paper mill winder. It appears that knowledge of the coil diameter is necessary in order to control the two reel drives, at the entry and the delivery ends, so that tension of the strip be maintained constant. This approach requires tracking two strip speed signals, such as S, and two diameter signals, such as D, in FIGS. 4 and 5.

Figure 6:
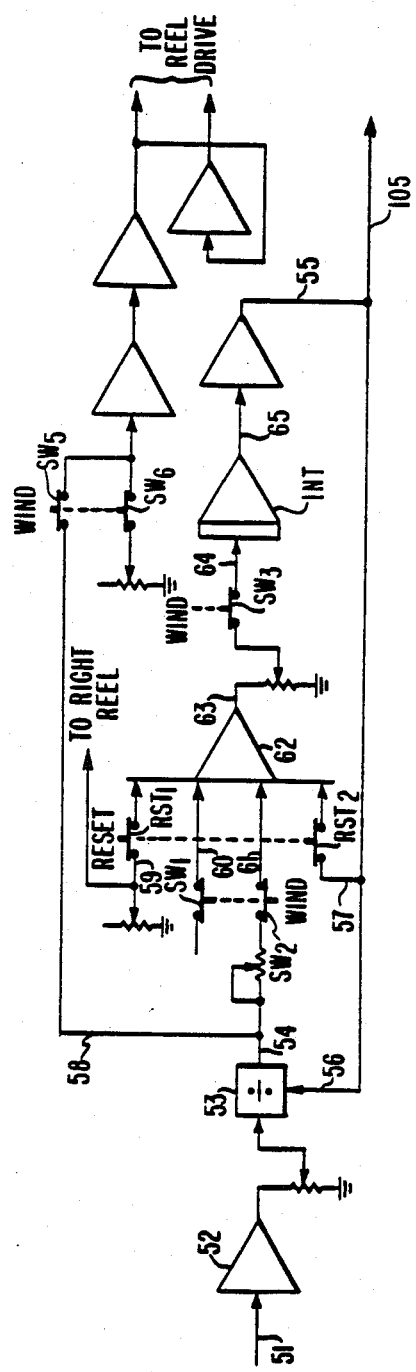
FIG. 6 shows a prior art mode of tracking the coil diameter and holding initial and final coil diameter values during calibration.

Referring to FIG. 6, for the right reel, on line 51 is derived a signal representing in volts the strip velocities coming out from the mill for winding operation. This signal is not used when unwinding since mill switches $SW_2$, $SW_3$, $SW_5$, $SW_6$ are open for unwind operation). Inverter 52 provides the opposite sign of the signal of line 51 and it is applied to a divider 53 which receives from line 56 the feedback value of the diameter $d_x$ (for winding), thus, applying on output line 54 a signal $s/d_x$.

The velocity divided by the diameter is equivalent to the rotating speed of the reel. It is compared with an rpm feedback signal derived on line 60. By comparator 62, the signal of line 54 is applied through the closed switch $SW_1$. The signal of line 51 is applied through the closed switch $SW_2$. $SW_1$ and $SW_2$ are closed when the reel is winding. Comparator 62 derives on line 63 an error signal which is passed via a switch $SW_3$ (also closed when the reel is winding) onto an integrator INT. For each detected error on line 63, an increment is stored by the integrator and accumulated to form a value on line 65 which represents the new value of the diameter. As diameter $d_x$, represented by the signal of line 65 and line 55, increases, this signal being fed back, by line 56 to divider 53, the signal $S/d$ appears on line 54 decreases so as to nullify the error. However, the increased diameter on the reel causes the rpm to decrease further and a new incremented value of $d_x$ is derived to be fed back to divider 53, thus helping the signal of line 54 to catch up with the rpm signal of line 60.

Calibration is effected after unwinding and before initiating the winding process. To this effect, switches $RST_1$ and $RST_2$ are closed on resetting. The initial coil diameter $D_1$ is passed by closed contact $RST_1$ onto comparator 62. The feedback value derived from lines 55 and 57 is passed by closed contacts $RST_2$ onto comparator 62. As a result, during calibration integrator INT is reset to an initial value corresponding to the initial diameter D. Then, the actual coil tracking process by lins 60 and 61 can be started by closing switches $SW_1$ and $SW_2$ and by resetting open the switches $RST_1$ and $RST_2$. Therefore, during winding on line 55 a signal $d_x$ is derived which represents the instantaneous value of the diameter as the right reel is being wound up from an initial value $d_1$. Once the coil has been formed totally from the pay-off, or left reel (not shown), a certain final diameter is reached which represents now the initial diameter $D_1$ at the time the right reel becomes the pay-off reel and the left reel (not shown) becomes the winding or delivery reel, in the reversible rolling mill of FIG. 6. Accordingly, after the winding operation just described has been terminated, upon reversal the integrator is cut off from line 63 by switch $SW_3$ (not open) and integrator INT retains the value $D_1$ accumulated on the right reel. The same process takes place now with the left reel deriving a diameter $d_X$ from a line similar to line 55 (not shown), whereas line 55 (of FIG. 6) goes to a calculation circuit for the left reel (not shown).

Figure 7:
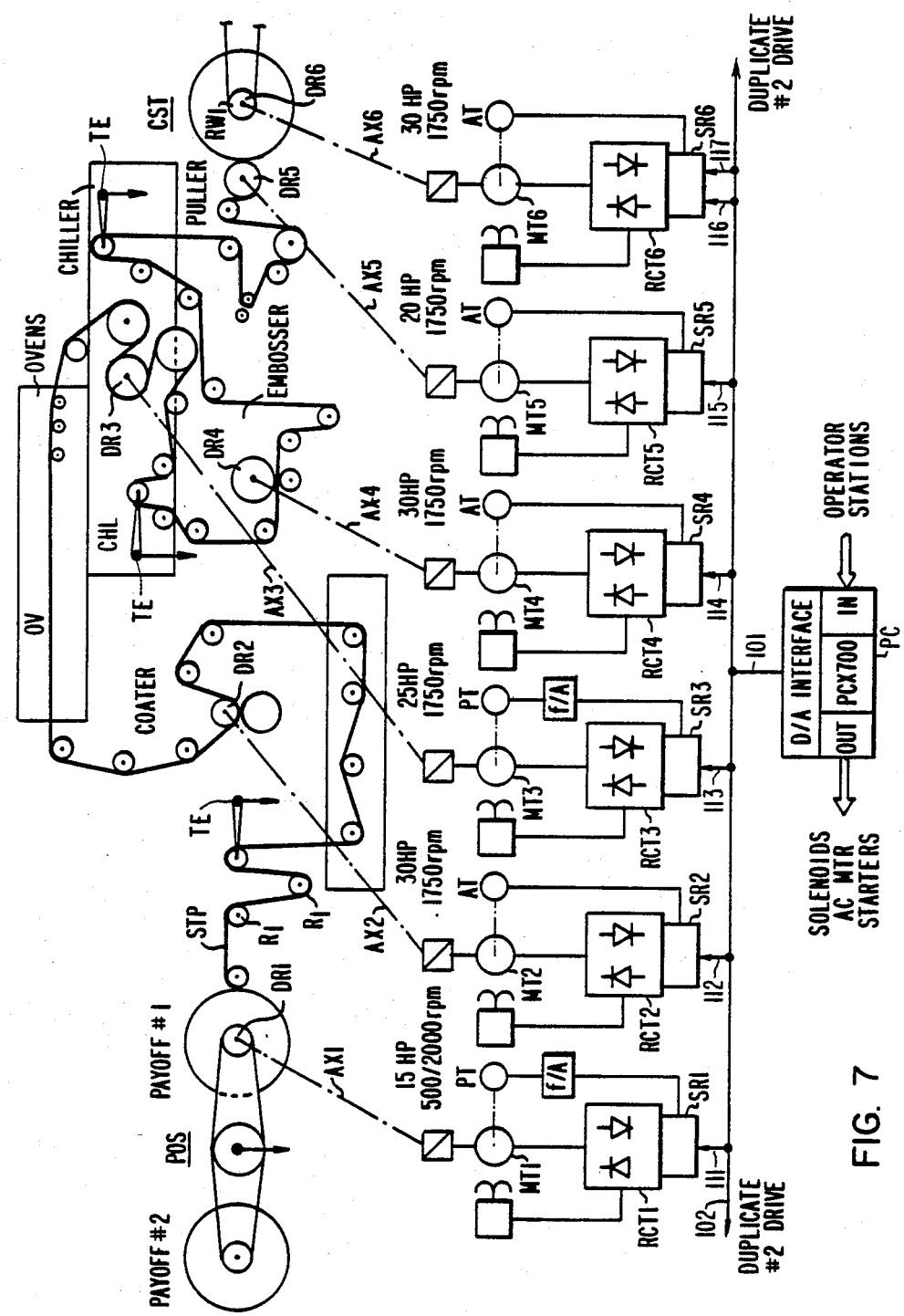
FIG. 7 is a block diagram showing the programmable controller according to the invention inserted in the speed controller of a reel drive system for illustration of the preferred embodiment.

Referring to FIG. 7, a strip of aluminum foil STP is continuously passed between a series of rolls such as $R_1$ which belong to a tensor distributing evenly the tension as the strip leaves a pay-off station POS and reaches a coiling station CST.

Driving is effected on the strip STP at six points by driving rolls $(DR_1-DR_6)$ which are driven along axes $(AX_1-AX_6)$ at speeds determined by DC motors $(MT_1-MT_6)$ which are part of a plurality of motor drives responding to a master reference signal and to individual speed control regulators $(SR_1-SR_6)$ establishing instantaneously a precise speed relationship from one roll $(DR_1-DR_6)$ to the next.

More generally, in a reel drive system it is important to (1) ensure an accurate determination of the diameter of the pay-off coil on the pay-off wheel $PO_1$ in service; (2) to control the speed of the pay-off coil $DRC_1$ as a function of encoding e.g. of coil diameter; (3) to control the speeds of all the rolls (DR1-DR6) in a proper speed relationship according to mass flow and in a linear fashion through individual ramp functions, such as determined by the operator at the processing station, in order to adjust the speed globally throughout the system; (4) to automatically establish inertia compensation as a function of the mass of metal on either the pay-off wheel $PO_1$, or the rewind wheel $RW_1$, at the coiling station ST; and (5) to effect such monitoring, control and adjustments with the assist of an operator for a plurality of parallel processing lines such as shown in FIG. 6 for one parallel processing line., another parallel processing line being identified as a duplicate drive #2 similarly extending from a second pay-off wheel $PO_2$ and to a second rewind wheel $RW_2$, respectively, at the pay-off station POS and at a coiling station CST.

More specifically, the aluminum foil strip STP is passed from the pay-off coil $PO_1$ between the tensor rolls $R_1$ a tension equalizer TE, then, brought at the proper angle into a coater roll section driven by a driving roll DR2, then, passed through an oven OV. The strip is driven by a driving roll DR3 disposed within a chiller CHL. From there it goes to an embosser EMB having a driving roll DR4 and is supplied by a driving roll DR5 to the rewind coil $RW_1$, itself driven by a driving roll DR6. Tension equalizers TE are properly staged at the two ends of the chiller section.

The motor drives are conventional. A rectifier section ($RCT_1$, ... $RCT_6$) supplies armature current to a DC motor ($MT_1$-$MT_6$). Each motor has a separate field excitation and a pilot tachometer controlling the speed regulator associated with the rectifier section. Depending upon their particular functions along the process line, the motor drives have some different characteristics. Typically, motor $MT_1$ which drives the pay-off wheel is a 15 HP motor having a speed varying between 500 and 2000 RPM. Motor $MT_2$ driving the coater roll is a 30 HP motor of base speed 1750 RPM. Motor $MT_3$ is a 25 HP motor of base speed 1750 RMP. For the embosser, the motor $MT_4$ has 30 HP and 1750 RPM. The puller motor $MT_5$ has 20 HP and 1750 RPM. The winder motor $MT_6$ is a 30 HP and 1750 RPM motor.

All these motors are operating in parallel in accordance with a master reference speed. For any change in the master reference control signal, each individual motor speed along the process line should receive a distributed amount of change, and this can be done in parallel from one process line to another simultaneously or individually. To this effect, according to the present invention, a digital programmable controller PC is provided responding to the operator's programming instructions and the process output signals via an input section ICS. Programmable controller PC generates between the input section and an output section OSC the prescribed command input signals for the motor drive system. The programmable controller PC, and the associated input and output sections are, preferably, of the NUMA-LOGIC (a Westinghouse trademark) type, e.g., a small compact, microprocessor-based programable controller of rugged and low-cost construction, easy to operate from an unskilled programmer's point of view.

In accordance with the present invention, such simple and known programmable controller system has been modified and improved in order to provide sophisticated functions for automatic control and monitoring of a motor drive system such as illustrated by FIG. 7.

From the explanation given hereinafter it will appear that the programmable controller of FIG. 7 permits an operator who is not knowledgeable in computer software, to effectively control the speed of the system so as to choose a ramp rate, increase or decrease of speed, to automatically reach a preset level of speed, to start or stop the motor drive. Moreover, the programmable controller exercises automatically all the prescribed routines of coasting to the set point speed reference, of emergency stop, of holding the assigned speed reference. All this is effected while taking advantage of the inherent stability of the controller in fixing values which are precise and free of drift.

It is now proposed to use a programmable controller of the ladder-diagram type in order to derive a coil diameter representative signal and to provide coil diameter initial and final values for calibration in a reel system. As shown in FIG. 7, the programmable controller is particularly suitable to generate such signals.

The invention will be described in the context of a NUMA-LOGIC 700 Series Programmable Controller currently on the open market and advertised by Westinghouse Electric Corporation, NUMA-LOGIC Department, 32031 Howard Street, Madison Heights, Mich. 48071.

Figure 8:
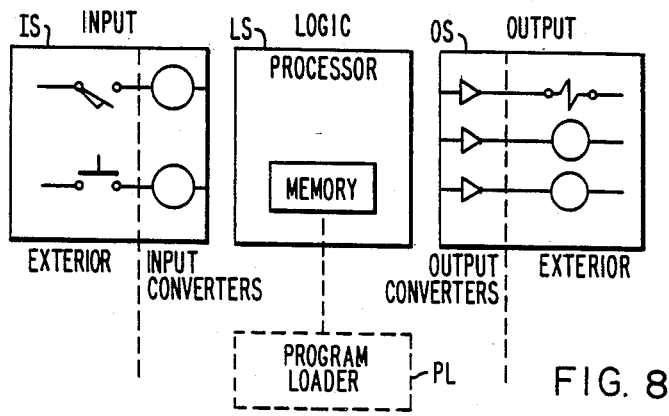
FIGS. 8–16 are illustrations of prior art circuitry representing elementary functions of a programmable controller of the ladder diagram type as can be used in implementing the present invention.

Referring to FIG. 8, the 700 Series Programmable Controller (PC-700) is schematically represented as including an input section (IS), a logic section (LS) and an output section (OS). The logic section includes a processor and a memory under control of a program loader (PL).

The input section (IS), typically, includes a plurality of modules associated either with a discrete input, or with an analog input. In a motor drive system the discrete inputs may be ON/OFF for RUN, START, STOP, ACCELERATE, INCH, ... supplied by pushbuttons, switches, contacts, etc. The individual signal is converted by the input circuit of the associated discrete input module to a proper processor voltage representing a ONE, or ZERO.

The analog input, which in a motor drive may be a feedback armature speed signal, a tension reference signal set point, ... is converted by the associated circuit of the analog input module to a byte representation stored in a register at processor voltages, e.g., ZERO's and ONE's. The multi-bit signals supplied by thumbwheels, instrumentation, are converted by the module to processor voltages. Typically, a multiplexed register input module allows to process up to sixteen 4-digit BCD numbers. Whereas a single-point register accepts only a single 16-bit number, typically, all register input modules accept 5 volts TTL signals and have the equivalent height of two discrete modules.

The output section is similar to the input section, but conversion is effected in the opposite direction. Each output circuit converts a processor signal to the voltage and current levels required by individual output devices, such as motor starters, solenoids and pilot lights. Analog output circuits convert multi-bit register information at processor voltages to the analog levels required by the associated instrumentation. For instance, the outputted signal may be in the range from 0 through 10 volts, of 4 through 20 milliamperes. Again, register output module circuits are provided to convert 16-bit register data at processor voltages to the 5 volts TTL levels typically required for instrumentation and readouts. Single register output circuits are provided, as well as multiplexed register output modules where group readouts are required.

Figure 9:
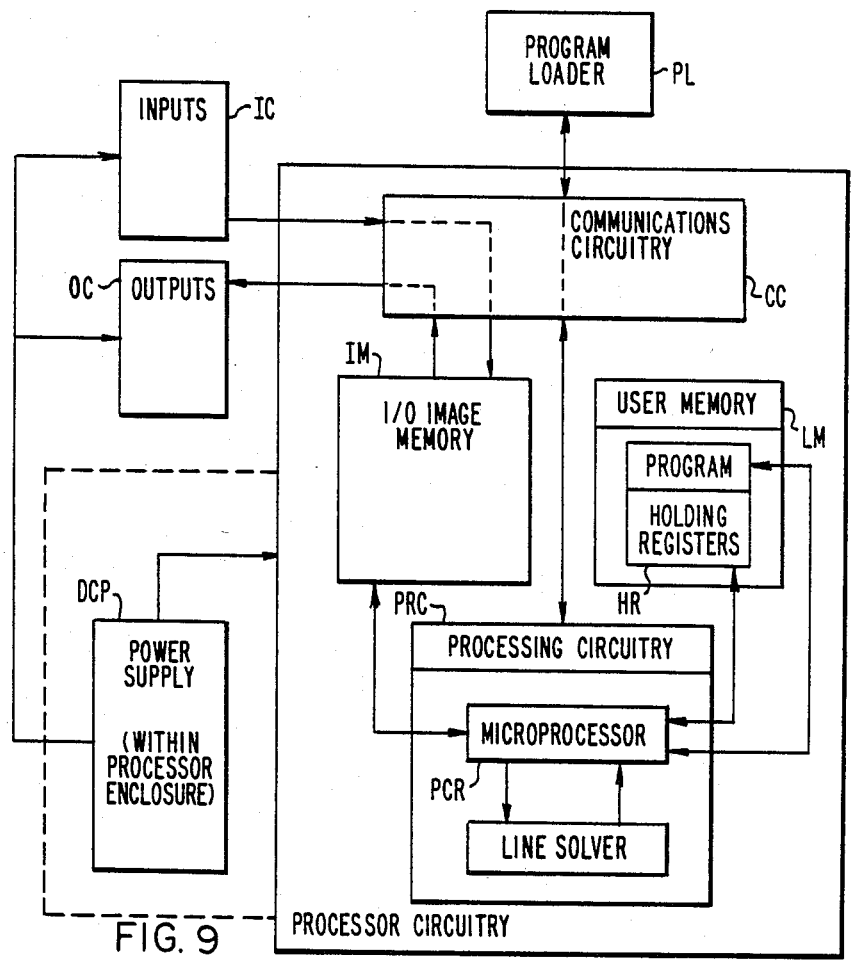

Referring to FIG. 9, the processor, in the processor section (PS), coordinates the operation of the total PC-700 control system. It includes a ladder memory (LM) containing instructions programmed by the program loader (PL).

The programmable logic controller is well known. See for instance "Programmable Logic Controllers-Painless Programming to Replace the Relay Bank" by G. Lapidus in Control Engineering, April 1971, pp. 49-60. Its application as a controller for machine equipment may be typified by U.S. Pat. Nos. 4,023,902; 3,976,981; 3,944,989 and 3,686,639. This prior art is illustrative of "a ladder program, logic diagram, or boolean equations that specify a control sequence" to be entered directly into the controller by the operator on the program loader "pressing the appropriate buttons on a programming panel or by writing instructions from a simple application-oriented instruction set" (Lapidus page 49 column 2). Accordingly, a technician not familiar with programming techniques will be able to establish with the programmable logic controller the internal logic required for the particular application. This is achieved by developing a ladder diagram simulating between an input line and an output line a succession of parallel circuits activated in a scanning order one at a time, each circuit involving a relay coil and associated contact which determine, when the relay is activated, or deactivated the electrical connection via contacts for a subsequent logic step through a subsequent circuit.

The ladder memory (LM) of FIG. 9 serves as the storage location for any holding register values (HR) required under the program. The I/O image memory (IM) of FIG. 9 contains the status of all the input circuits at the beginning of each scan of the ladder diagram sequence, and stores the newly determined coil and output register states upon each step of the ladder reached during the scan.

The processing circuitry simulating actual logic through the processor section is established with the program loader by the operator so as to construct, contact-by-contact, each circuit in the ladder diagram according to the program. The selected contacts are used to determine whether the circuit is conducting. When a coil is controlled by the associated circuit becoming conductive or non-conductive, the coil determines the state of its contacts depending upon whether they are normally open or normally closed contacts. The state of the coil is stored in the I/O image memory according to the newly determined state of the circuit. At the beginning of each scan of the ladder, the states of the input circuits are transferred to the I/O image memory by the communications circuitry (CC). At the end of each scan of the ladder, the communications circuitry (CC) transfers the output states stored in the I/O image memory to the output circuits. The communications circuitry also transfers the instruction from the program loader (PL) to the processor.

Figure 10:
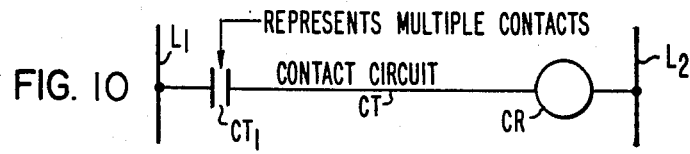

DC power is provided to operate the processor, and the input and output circuits. Referring to FIG. 10, an elementary control relay coil (CR) is connected in circuit by line CT with normally open contacts $CT_1$ between $L_1$ and $L_2$ the input and output lines of the ladder, respectively.

Figure 11:
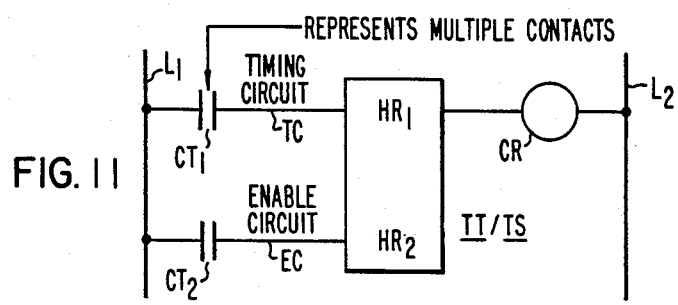

Referring to FIG. 11, circuit control timer (TM) is illustrated including a preset value registered in a hold register $HR_1$ (of the I/O image memory) and a destination hold register $HR_2$. A timing circuit (TC) with contacts $CT_1$ and an enable circuit (EC) with contacts $CT_2$ are associated with the $HR_1$ and $HR_2$, respectively. The timer, a local clock, is allowed to run only when the timing circuit is conducting. When the timer is running, increments of time in digital representation are counted. Accumulated time is stored in $HR_2$, and the associated coil will be energized in its contacts (typically $CT_1$) will be operated when the actual value of $HR_2$ equals the present value of $HR_1$. The timer will retain the accumulated value on $HR_2$ as long as contacts $CT_2$ of the enable circuit are closed. When the enable circuit is not conducting, the timer is reset and $HR_2$ is held back to zero, as well as $HR_1$. The preset value of $HR_1$ may be programmed as a constant along with the timer, or it may come from an input register IR, another holding register HR, or an output register OR, so that its value may be varied.

Thus, the I/O image memory contains representations stored which correspond to an input register IR, or an output register OR, as well as to a hold register HR.

Similar teachings are used to represent an add or a subtract function, a divide or a multiply function, a comparison function, which are all to be used in the implementation of the present invention.

Figure 12:
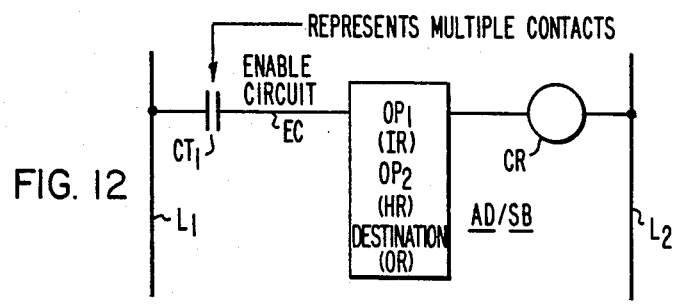

FIG. 12 illustrates the ADD or SUBTRACT function. An enable circuit EC having normally open controlling contacts $CT_1$ controlled by the scanning process Operand $OP_1$ comes from an input register IR, (but it may come as well from an output register or a holding register). Operand $OP_2$ comes from a holding register HR as shown (but it may come as well as from an input register, an output register, or it can be a constant value set in the system). The result of the operation is placed in a destination register which is shown as an output register OR, but may be as well a holding register. Typically, the PC-700 allows 4-digit decimal numbers (up to 9999) to be added or subtracted producing a 4-digit decimal result. The addition or subtraction is performed when the enable circuit changes from a nonconducting to a conducting state.

To add, $OP_1$ is added to $OP_2$ and the result placed in destination register OR. If the result is greater than 9999, the coil CR is energized and the amount of overflow (greater than 10,000) is placed in the destination register OR. The coil is energized only if the result exceeds 9999.

To subtract, $OP_2$ is subtracted from $OP_1$, and the result is placed in the destination register (OR in FIG. 12). If the result is less than zero, the coil is energized and the amount of multi-flow (less than 0000) is placed in the destination register OR.

In either case, when the enable circuit EC is not conducting, the coil is deenergized. When the coil is forced, only its contacts (and output circuit if any) are affected; the function continues to operate according to the enable circuit EC.

Figure 13:
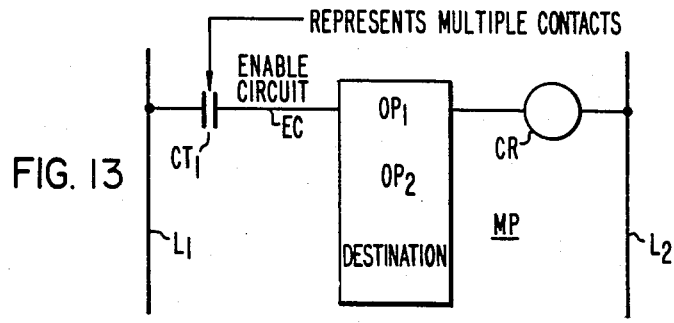

FIG. 13 illustrates the multiply function. Two 4-digit decimal numbers (up to 9999) to be multiplied produce up to eight decimal digits. The two numbers are multiplied only when the enable circuit EC changes from a non-conducting to a conducting state (by contact $CT_1$ in FIG. 13). Operand $OP_1$ may come from an input register, an output register or a holding register. Operand $OP_2$ may come from an input register, an output register, a holding register. It may also be a programmed constant. $OP_1$ and $OP_2$ are stored in binary form (after conversion if the number is in BCD form). The CR coil is energized when the enable circuit EC, through contacts $CT_1$ (as illustrated), is conducting and, conversely, CR is deenergized when EC is not conducting. Forcing the CR coil affects only the associated contacts (and output circuit if any). The CR function continues to operate according to the enable circuit EC. The result of the multiplication is placed in a pair of registers (holding, output, or destination register).

Figure 14:
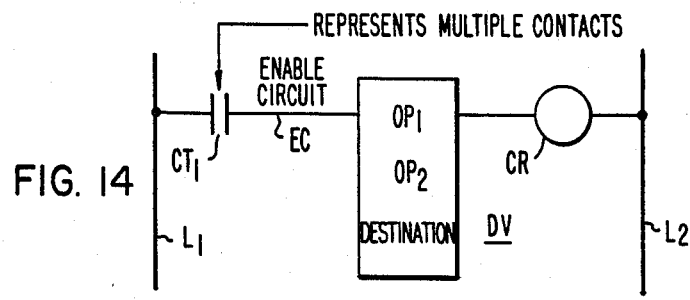

The divide function is illustrated in FIG. 14. Operand $OP_1$ is divided by operand $OP_2$. $OP_1$ could be an 8-digit decimal number of $OP_2$ a 4-digit decimal number. The result can be up to four digits in this example. $OP_1$ is divided by $OP_2$ when conducting. $OP_1$ comes from a pair of registers (input, output or holding register). The result is placed in a pair of registers (output, holding register) serving as destination registers; the first containing the result, the second containing the remainder.

The CR coil is energized if $OP_2$ equals zero or if the result is greater than 9999 (in the example). The coil is deenergized when the enable circuit EC is not conducting. Forcing the CR coil affects only the associated contacts; the CR function continues to operate according to the enable circuit EC.

Figure 15:
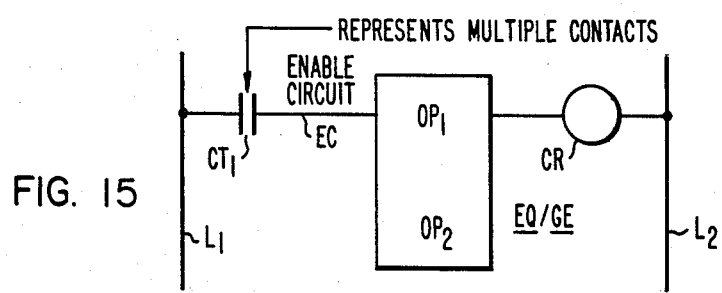

The comparison function is illustrated by FIG. 15. Two operands $OP_1$, $OP_2$ are compared when the enable circuit EC conducts. If the EQUAL function is intended between $OP_1$ and $OP_2$, when the enable circuit EC is conducting and $OP_1$ is equal to $OP_2$, coil CR will be energized. If $OP_1$ is not equal to $OP_2$, or if the enable circuit EC is not conducting, the coil will be deenergized.

If the comparison function is intended to establish the relationship larger than, or smaller than, between $OP_1$ and $OP_2$, choosing energization of the coil CR when the condition is fulfilled and the enable circuit is conducting, will achieve the result.

Figure 16:
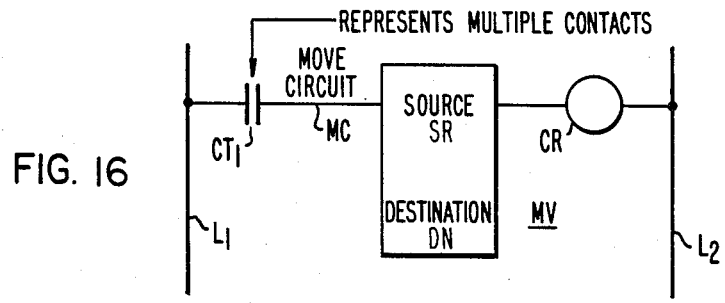

Referring to FIG. 16, the move function is illustrated by block MV associated with a coil CR and contacts $CT_1$. When the move circuit MC is conducting, data is transferred from the source SR to the destination DN. The source may be a holding register, an input register, an output register, an input or an output group. The destination may be a holding register, an output register, or an output group. Such move occurs on each processor scan, and the coil is energized.

Figure 17:
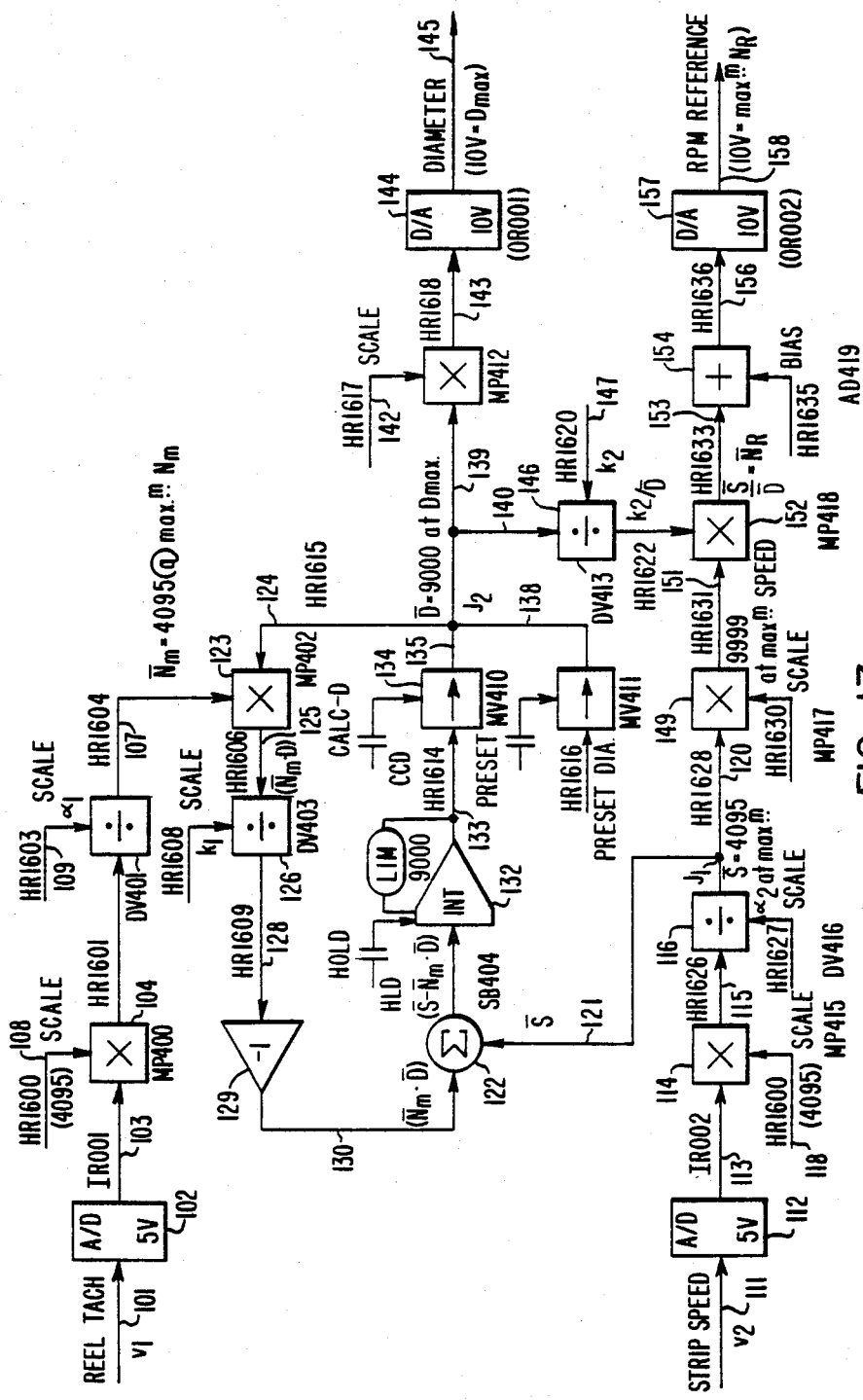
FIG. 17 is a block diagram representation of a circuit for coil diameter calculation and for the generation of a coil diameter signal, in association with circuitry for the generation of a speed reference signal used, according to the present invention, within the programmable controller of FIG. 7.

Referring to FIG. 17, the block diagram shows a combination of several of the functions of FIGS. 8–16 arranged to instantaneously perform coil diameter calculation and establish initial and final coil diameter values for calibration.

Considering the delivery reel of FIG. 7, at station CST, driven by motor MT6 and roll DR6, the coil is wound on a mandrel and as the process goes the diameter increases from the mandrel diameter. Referring to FIG. 17, the reel tachometer provides a feedback signal $v_1$ which is fed by line 101 into an A/D converter 102 of the programmable controller PC. Similarly, the strip speed $v_2$ is derived and supplied by line 111 onto another A/D converter 112 of the programmable controller PC. Considering first, A/D converter 102, the digital counterpart of signal $v_1$ is stored into input register IR001 (line 103) and it is scaled by a multiplier 104 receiving on line 108, the maximum value 4095 in holding register HR1600. If the A/D converter 102 has a maximum voltage of 5 volts, the contents of input register IR001 would be 4095 for $v_1$ 5 volts and proportionally less for lower values of the input signal $v_1$. In order to normalize the feedback value $v_1$, it is scaled by HR1600 (line 108) and by HR1603 (line 109) which contains such as value $\alpha_1$ that when multiplying $v_1$ by 4095 (in multiply function 104) and then dividing by $\alpha_1$ the output will be such that on line 107 the value in holding register HR1604 thereof will always equal a count of 4095 for $\overline{N}_m=1$, if $\overline{N}_m$ is the outputted digital signal. $\overline{N}_m$ represents the normalized RPM of the reel, e.g. the surface speed of the reel which is the maximum rated strip speed at minimum rated coil diameter, e.g. for the empty mandrel (or the initial coil diameter). In other words, $v_1=\alpha_1/5\times 4095$ where $v_1$ is the value in volts on line 101 and $\overline{N}_m=1$, $v_1$ being between zero volts and 5 volts.

Referring to FIG. 2, where S is the strip velocity, where N is the motor RPM signal, in normalized terms $\overline{S}=\overline{D}\cdot\overline{N}$, then $$\overline{N}=\overline{S}/\overline{D}$$

A preset diameter is usually provided at the beginning of the coil. This preset value is used to generate appropriate speed references for the reel until such time as the diameter calculator is activated from some minimum speed point. The program in the programmable controller takes this fact into account and also allows for retention in memory of the instantaneous diameter reached whenever the process is, for any reason, stopped.

Since $\overline{D}\cdot\overline{N}=\overline{S}$, the normalized diameter value $\overline{D}$ at junction $J_2$ and line 124, e.g. in holding register 1615 is multiplied at 123 with $\overline{N}_m$ of line 107, thereby providing $(\overline{N}_m\cdot\overline{D})$ in holding register HR 1606 (line 125). By analogy with the comparator 62 of FIG. 6, the calculated value of S which is derived on line 125 is to be compared at 122 with the feedback value of S ($v_2$ of line 111) in order to integrate the difference at 132 as an indication of the diameter $\overline{D}$ on line 135 and junction $J_2$. These steps will now be explained with more details.

First, similarly with what has been done with signal $v_1$ of line 101 onto normalized value $\overline{N}_m$, the digital value in IR002 (line 113) at the output of A/D converter 112, is normalized and scaled, first with multipler 114 and multiplication factor 4095 in HR1600 (line 118), secondly by dividing at 116 by $\alpha_2$ (stored in HR1627) from line 119.

At junction $\overline{J}_1$ and line 120, the value $\overline{S}$ is fed from HR1628 by line 121 into summer 122 which also receives on line 130 the negative signal $-(\overline{N}_m\cdot\overline{D})$ from inverter 129. Before reaching inverter 129, the contents of HR1606 from multiplier 123, are modified by a scaling factor $K_1$ (line 127 for HR1608 into divider 126) so chosen that HR1609 at the output (line 128) is 4095 at maximum surface speed. $K_1=9000/r$, where r is the ratio between maximum and minimum diameters. On the other hand, for maximum diameter $\overline{D}=1$ and for purposes of normalization, a value of 9000 is chosen which is stored into HR1615. As a result, summer 122 compares from lines 130 and 121 two compatible normalized values, and outputs on line 131 $\overline{S}-\overline{N}_m\cdot\overline{D}$, which is integrated at 132 with the set limit of 9000. Integration by INT is held at the accumulated value when contacts HLD are closed, namely when winding is stopped, thereby to hold the diameter recorded as output in holding register HR 1614 (line 133). When calculating the diameter, contacts CCD cause the move function 134 to pass the $\overline{D}$ value of HR1614 onto junction $J_2$. When presetting conditions are required, contacts CCD controlling move function 136 are open and contacts PST for preset are closed, whereby move function 136 causes the preset diameter value (mandrel diameter or initial coil diameter) stored in holding register HR1616, via line 138 to be available at junction $J_2$.

From junction $J_2$, diameter $\overline{D}$ (which has a value 9000 at maximum) is scaled by multiplier 141 and holding register HR1617 (line 142), then outputted (output register OR001) and converted to analog signal by D/A converter 144, providing a signal of 10 volts magnitude for D maximum (line 145).

FIG. 16 also includes a circuit for the derivation of a speed reference signal (on line 158). To this effect the relation S/D is utilized and the normalized values of S and D with proper scaling are derived and combined upon multiple function 152. From junction $J_1$ holding register HR1631 (line 120) has its contents scaled at 149 by the value of HR1630 so that for $\overline{S}=1$ the maximum value will be 9999 in HR1631 (line 151).

On the other hand, from junction $J_2$, the value of $\overline{D}$ (which is moved either from HR1616 onto line 138, or from HR1614 onto line 135) is converted to $K_2/\overline{D}$ by divider 146 in response to numerator input from HR1620 (line 147).

Coefficient $K_2$ is such that $K_2 = 9000 \times 4095/r$ where r is the ratio between maximum and minimum diameters. The so adjusted value of the normalized diameter is stored in HR1622 (line 148) then multiplied by the contents of HR1631 (line 151) so that on line 153 (HR133) is derived an RPM reference value corresponding to the actual surface speed ($v_2$ on line 111) and the actual diameter of the coil ($\overline{D}$ at junction $J_2$ properly adjusted at line 148).

In order to take into account the possibility of an overspeed, a bias value is introduced by HR1635 into adder 154. The resulting value goes into HR1636 (line 156) to be passed into an output register (DR002) which is associated with a D/A converter providing an analog signal between 0 and 10 volts. The RPM reference signal $N_R$ is thus outputted on line 158.

Figure 18A:
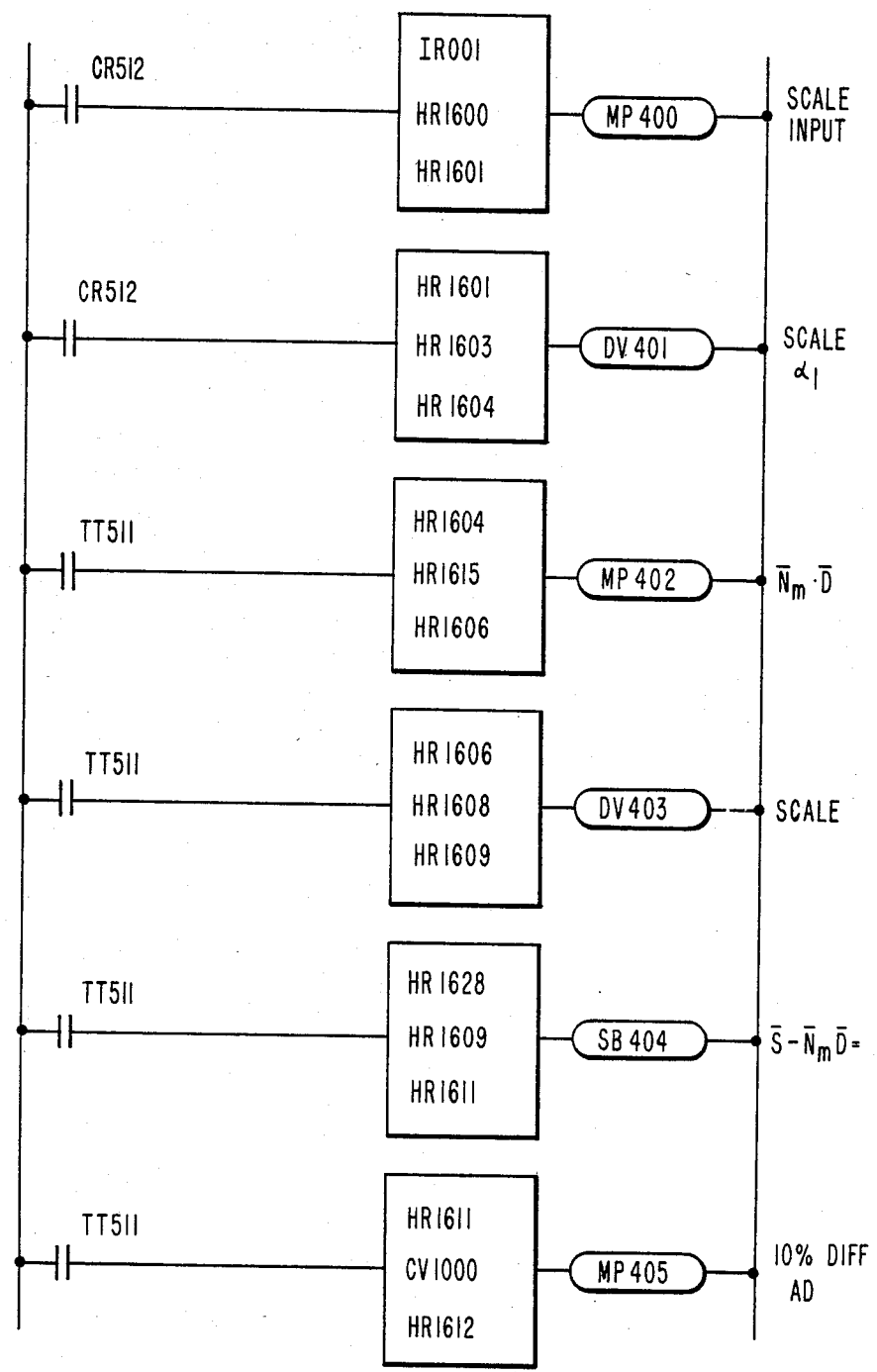
FIGS. 18A–18D are a ladder diagram representation of the operative steps of the block diagram of FIG. 17.
Figure 18B:
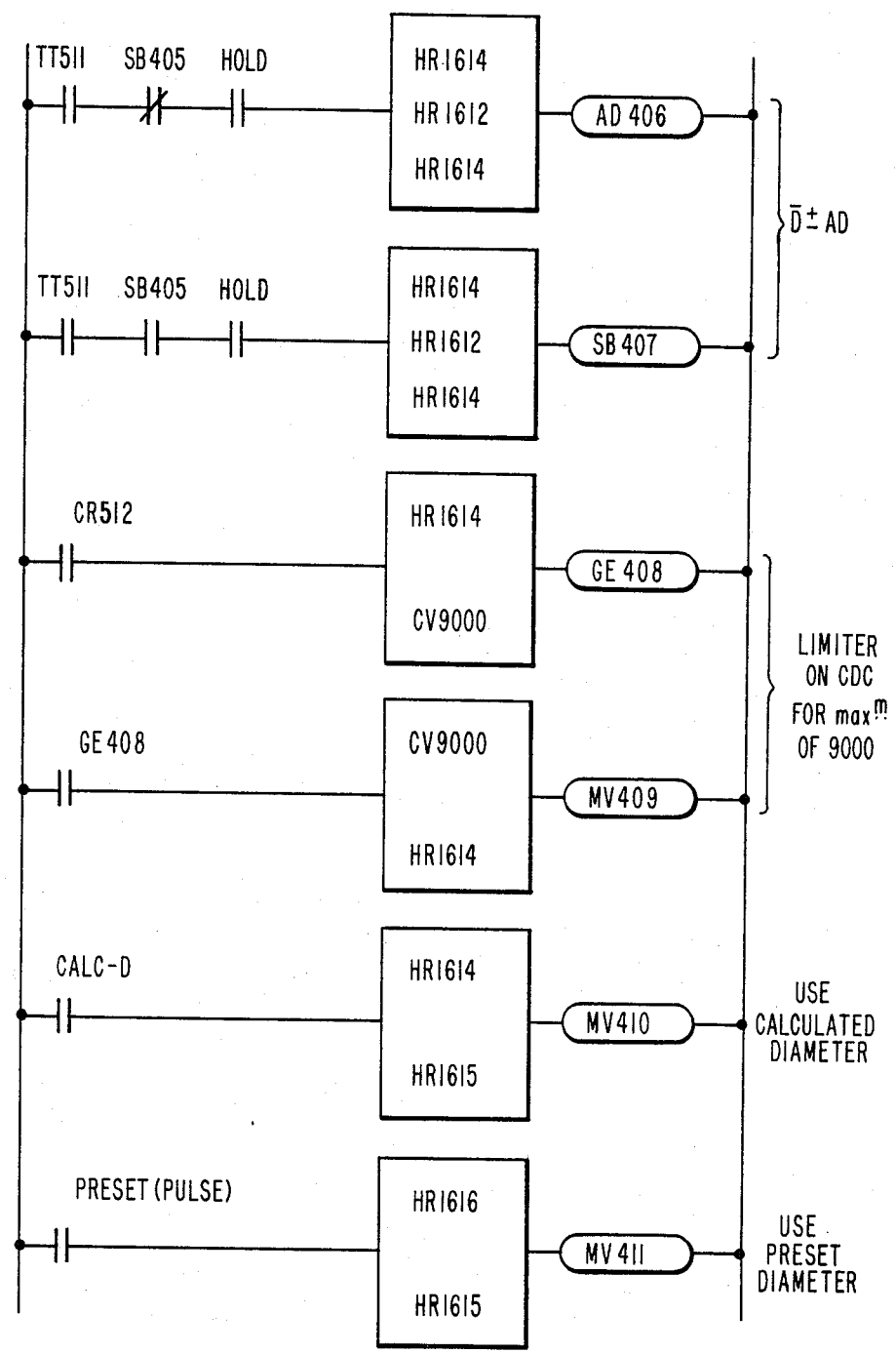
Figure 18C:
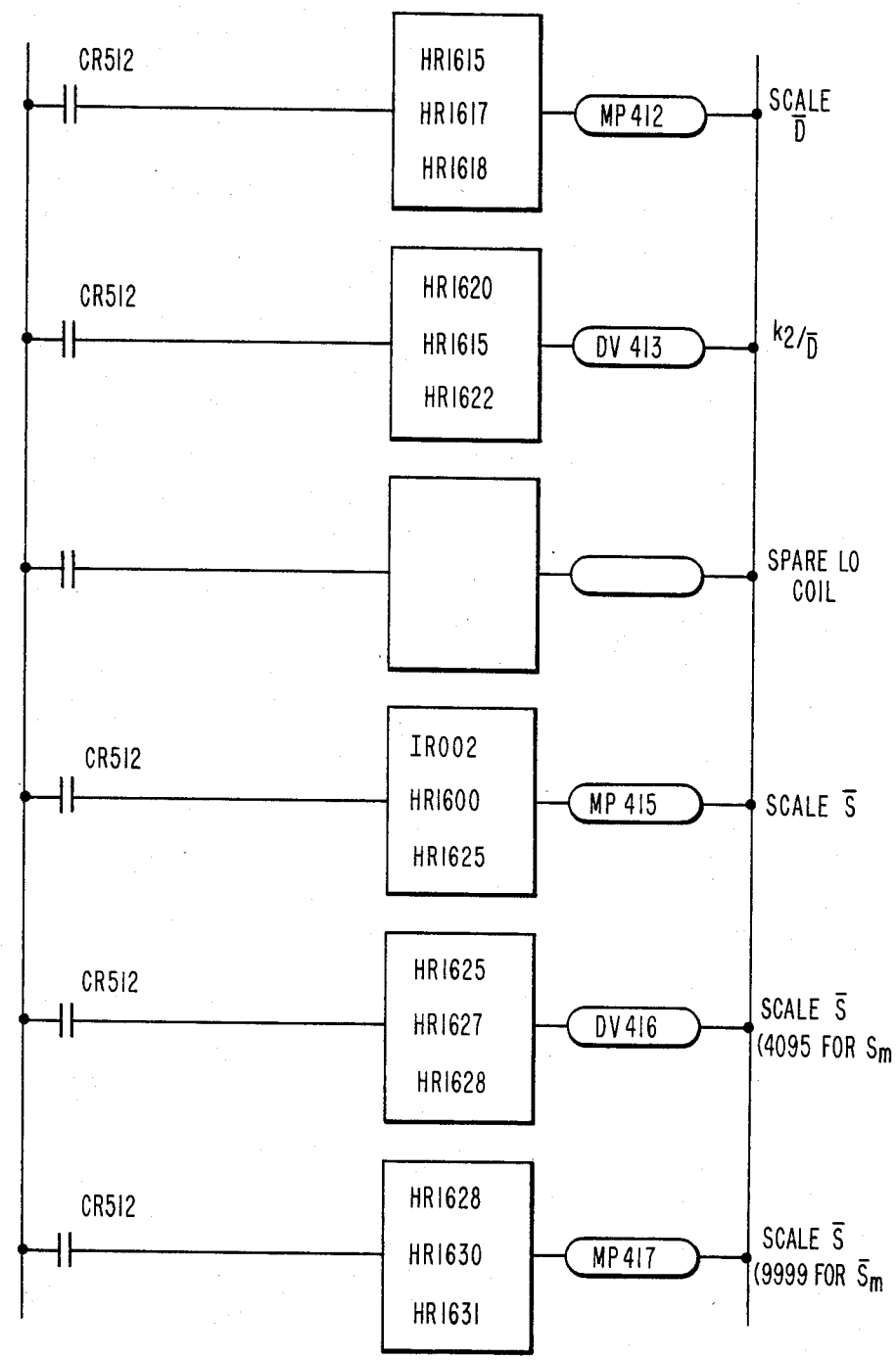

| Lines: | | |
|---|---|---|
| | FIG. 17 | Explanation |
| (FIG. 18A) | | |
| 1 | 103,104,105 | scale input |
| 2 | 105,109,106,107 | scale $\alpha_1$ |
| 3 | 107,123,124,125 | calculate $\overline{N}_m \cdot \overline{D}$ |
| 4 | 125,126,128 | scale by $k_L$ |
| 5 | 128,129,130,122,121 | calculate $\overline{S} - \overline{N}_m\overline{D}$ |
| 6 | not shown | |
| (FIG. 18B) | | |
| 1 | not shown | |
| 2 | not shown | |
| 3 | 132, INT | limiter for maximum 9000 |
| 4 | 132, INT | limiter for maximum 9000 |
| 5 | CCD,133,134 | use calculated diameter |
| 6 | PST,137,136 | use present diameter |
| (FIG. 18C) | | |
| 1 | 124,139,141,144,143 | scale $\overline{D}$ |
| 2 | 140,146,147 | calculate $k_2/\overline{D}$ |
| 3 | 113,114,118,115 | scale $\overline{S}$ |
| 4 | 115,116,$J_1$ | scale $\overline{S}$ (4095 for $S_m$) |
| 5 | $J_1$,120,149,151 | scale $\overline{S}$ (9999 for $S_m$) |

Figure 18D:
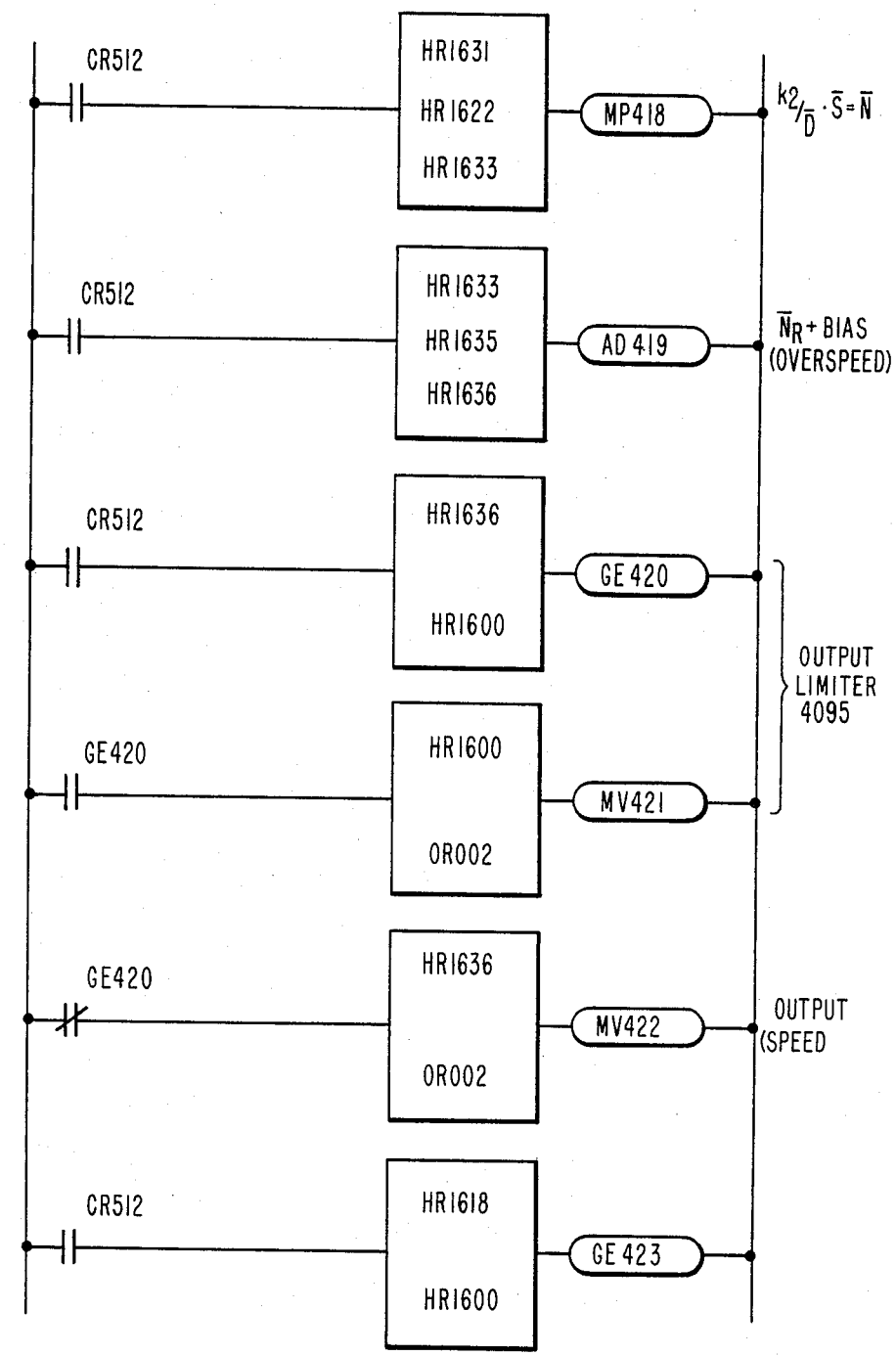

| -continued | | |
|---|---|---|
| Lines: | | |
| | FIG. 10 | Explanation |
| (FIG. 18D) | | |
| 1 | 151,152,153 | calculate $\overline{s}$,4 S $k^2/\overline{D} = \overline{N}$ |
| 2 | 153,154,156 | add bias for overspeed |
| 3 | not shown | |

We claim:

1. In a line for processing a strip of material at a controllable strip velocity between a pay-off and a winding reel driven at a controllable speed, a motor drive system for controlling the speed of one of said pay-off and winding reels, in relation to a motor speed representative signal and a strip speed representative signal, comprising:

a program controller including:

first A/D converter means operative upon each of successive scan time intervals (T) for converting said strip velocity signal into a first digital signal S representative of strip velocity;

second A/D converter means operative upon each of successive scan time intervals for converting said reel speed signal into a second digital signal N representative of reel speed;

means responsive to said N digital signal and to a digital representation of the actual diameter D of the wound coil upon said reel at the beginning of a new scan time interval for calculating the product ND;

means responsive to the product ND and to said S digital signal for deriving an error (S−ND);

integrating means responsive to said error (S−ND) for increasing said digital representation D by a corresponding and proportionate amount at the end of a current time interval (T) to provide a new initial diameter for the next time interval;

first D/A converter means responsive upon each scan time interval to said diameter D digital representative signal for deriving a diameter D instantaneous value analog representative signal;

means responsive to said diameter D digital representative signal and to said S digital representative signal for providing S/D digital representative signal; and second D/A converter means responsive upon each scan time interval to said S/D digital signal for deriving a speed reference signal in accordance with said new initial diameter;

said motor drive system further including means for controlling the speed of said reel in accordance with said speed reference signal.

2. The reel system of claim 1 with first normalizing means in said program controller responsive to said S digital signal for deriving a normalized representation signal $\overline{S}$ thereof;

second normalizing means in said program controller responsive to said N digital signal for deriving a normalized representation signal $\overline{N}$ thereof;

third normalizing means in said program controller responsive to said D digital signal for deriving a normalized representation signal $\overline{D}$ thereof;

said ND product calculating means being operative to calculate the product $\overline{ND}$;

said error (S−ND) deriving means being operative to derive an error ($\overline{S}-\overline{ND}$);

said integrating means being operative with said error $(\overline{S}-\overline{ND})$ to derive said signal $\overline{D}$;

with said S/D digital representative signal deriving means being operative with said signals $\overline{S}$ and $\overline{D}$ to derive an $\overline{S/D}$ representative signal;

the program controller further including means responsive to said $\overline{D}$ signal for generating an output digital signal D and means responsive to said $\overline{S/D}$ signal for generating an output signal S/D;

said first and second D/A converter means being responsive to said output signal D and to said output signal S/D, respectively.

* * * * *